(12) United States Patent
Mei

(10) Patent No.: US 7,420,772 B1
(45) Date of Patent: Sep. 2, 2008

(54) INTEGRAL ANVIL FOR PRE-LOADING A DISK DRIVE SUSPENSION ASSEMBLY

(75) Inventor: Shijin Mei, Murrieta, CA (US)

(73) Assignee: Magnecomp Corporation, Temecula, CA (US)

( * ) Notice: Subject to any disclaimer, the term of this patent is extended or adjusted under 35 U.S.C. 154(b) by 372 days.

(21) Appl. No.: 11/282,450

(22) Filed: Nov. 17, 2005

(51) Int. Cl.
*G11B 5/48* (2006.01)
(52) U.S. Cl. .................................. 360/97.01
(58) Field of Classification Search ............... 360/244.8
See application file for complete search history.

(56) References Cited

U.S. PATENT DOCUMENTS

| | | | |
|---|---|---|---|
| 4,603,567 A | 8/1986 | Smith et al. | |
| 5,297,413 A | 3/1994 | Schones et al. | |
| 5,471,734 A | 12/1995 | Hatch et al. | |
| 5,473,488 A | 12/1995 | Gustafson et al. | |
| 5,588,200 A | 12/1996 | Schudel | |
| 5,636,013 A | 6/1997 | Swift | |
| 5,657,187 A | 8/1997 | Hatch et al. | |
| 5,682,780 A | 11/1997 | Girard | |
| 5,687,597 A | 11/1997 | Girard | |
| 5,712,468 A | 1/1998 | Ace | |
| 5,818,662 A | 10/1998 | Shum | |
| 5,832,763 A | 11/1998 | Girard | |
| 5,898,543 A | 4/1999 | Jagt et al. | |
| 5,943,189 A | 8/1999 | Boutaghou et al. | |
| 5,995,335 A | 11/1999 | Jurgenson et al. | |
| 6,011,239 A | 1/2000 | Singh et al. | |
| 6,046,887 A | 4/2000 | Uozumi et al. | |
| 6,063,508 A * | 5/2000 | Hanrahan et al. | 428/596 |
| 6,072,151 A | 6/2000 | Jurgenson et al. | |
| 6,154,952 A | 12/2000 | Tangren | |
| 6,198,602 B1 * | 3/2001 | Vera et al. | 360/244.5 |
| 6,697,228 B1 | 2/2004 | Mei et al. | |
| 6,778,362 B1 * | 8/2004 | Davis et al. | 360/244.8 |
| 6,956,721 B1 * | 10/2005 | Khan | 360/244.8 |
| 2002/0108427 A1 | 8/2002 | Matsushita | |
| 2003/0138203 A1 | 7/2003 | Imakado et al. | |
| 2003/0147170 A1 | 8/2003 | Yamagishi et al. | |
| 2003/0154005 A1 | 8/2003 | Wong et al. | |
| 2003/0188563 A1 | 10/2003 | Wong et al. | |
| 2004/0016733 A1 | 1/2004 | Thaveeprungs-riporn | |
| 2005/0030670 A1 * | 2/2005 | Ando et al. | 360/244.8 |

* cited by examiner

*Primary Examiner*—Mark Blouin
(74) *Attorney, Agent, or Firm*—Intellectual Property Law Office of Joel D. Voelzke

(57) ABSTRACT

A baseplate in a disk drive suspension system is configured with an integral anvil having a spring-forming edge that coincides with an optimal bend location on a linear flex spring. The spring attaches to upper surfaces of baseplate and load beam to allow for alignment of a rolling tool above the optimal bend location. During assembly, rolling tool pressure permanently bends the spring around the spring-forming edge to create a desired pre-load characteristic for the suspension system. The integral anvil may include a relief portion for reducing friction on the spring during the bending operation. A method for pre-loading a suspension assembly comprises forming an integral anvil on a baseplate, forming a spring-forming edge on the integral anvil, positioning an optimal bend location on the spring to coincide with the spring-forming edge, and forming a permanent bend in the spring by applying pressure on the spring around the spring-forming edge.

32 Claims, 9 Drawing Sheets

INTEGRAL ANVIL FOR PRE-LOADING A DISK DRIVE SUSPENSION ASSEMBLY

BACKGROUND

1. Field of the Invention

The present invention relates generally to suspension systems for hard disk drive systems. More specifically, the present invention relates to providing tooling features integral to the suspension system to aid in forming suspension system components. The invention relates most specifically to forming anvils on a suspension system baseplate for pre-load forming of suspension system springs.

2. Related Art

Suspension systems for suspending read/write heads in hard disk drives (HDD) are well known in the art. In a typical HDD suspension system, the read/write head is mounted on a slider having an aerodynamic design, such that airflow between the slider and a spinning disk generates lift that allows the head to fly above the disk surface an optimal distance for reading data from the surface or writing data to the surface. The slider is typically bonded to a flexure (or gimbal), which permits the slider to pitch and roll as it tracks fluctuations in the disk surface. The flexure is coupled to a load beam, which is formed from a metal such as stainless steel and configured with a spring portion that applies a loading force, also known as a "pre-load" or "gram force", to counteract the lift. A rigid end of the load beam is coupled to a baseplate, where an actuator is provided for precisely positioning the read/write head through actuation of the load beam.

The spring portion of the load beam is a linear flex-spring, or planar cantilever-type spring, typically formed from a metal sheet. The desired pre-load force is achieved by forming one or more bends in the linear spring portion of the load beam, taking into account the spring constant of the material, its mass, and the expected load. FIG. 1 illustrates a typical suspension assembly 100 consisting of a baseplate 102, springs 104, and load beam 106. In one commonly practiced technique, during manufacture of the assembly 100 springs 104 are preloaded using appropriate forming tools, such as tooling anvil 108 and roller 110. Springs 104 are bonded to the underside of baseplate 102 and load beam 106 to allow for placement of tooling anvil 108 at an optimal bend location 112 beneath the springs. So located, a bendable area 114 of each spring 104 is bent around a corner 140 of tooling anvil 108 under pressure of roller 110 as it pushes downward and rolls away from baseplate 102 in the directions shown by dashed lines. The resulting bend angle radius of spring 104 is therefore influenced by the curvature of corner 140. This curvature will change over time after repeated use of tooling anvil 108. Eventually, tooling anvil 108 will need to be replaced to avoid out-of-tolerance formation of bend angle radius in springs 104.

The main problem with the foregoing technique is that the accuracy of the bend location depends on placement of tooling anvil 108 with respect to assembly 100. HDD suspension systems typically demand very strict manufacturing tolerances on the order of 1.0 mil; therefore anvil placement requires high precision tooling, which adds to the manufacturing expense.

Another problem with the conventional anvil-and-roller technique is illustrated in FIG. 2, which shows a side view of a typical suspension assembly 200. Assembly 200 essentially consists of the same components as in assembly 100, except that a bridging area 214 of spring 204 has a shorter length relative to the diameter of roller 210. In suspension assemblies having this dimensional constraint, it may be impossible to impact roller 210 at the optimal bend location 212 due to mechanical interference from baseplate 202 or load beam 206. Where springs are bonded to the underside of the assembly, interference occurs as roller 210 encounters baseplate or load beam steps located above the surface of the spring. The example assembly 200 illustrates this interference effect: placement of roller 210 is limited by the step of baseplate 202 such that impact point 216 is displaced from optimal bend location 212 by a horizontal offset A. An excessive offset results in formation of the bend in a non-optimal location, or creation of an undesirable secondary bend.

In view of the foregoing, there remains considerable margin for improving pre-loading techniques for disk drive suspension assemblies.

SUMMARY

Various embodiments of the present invention provide components, assemblies or methods for pre-loading hard disk drive suspension assemblies. Generally, the pre-loading machines and means disclosed herein enable higher-precision placement of optimal bend locations in suspension system springs.

A baseplate in a hard disk drive suspension system is configured with at least one integral anvil extending from a distal end of the baseplate toward a load beam. A linear flex spring connected between the baseplate and load beam has an optimal bend location where formation of a permanent bend creates a desired pre-loading characteristic for the assembly. The integral anvil includes a spring-forming edge that coincides with the optimal bend location on the spring and acts as a forming tool to facilitate creation of the permanent bend.

The integral anvil may be further configured to include a relief portion having less thickness than a uniform baseplate thickness from which the integral anvil is formed. In one embodiment, the relief portion comprises a channel running in a transverse direction parallel to the spring-forming edge. In another embodiment, the relief portion comprises the entire upper surface of the integral anvil. The relief portion may be etched or machined into the surface of one or more integral anvils.

A hard disk drive suspension assembly according to the invention includes a load beam, a linear flex spring connected to the load beam, and a baseplate. The baseplate comprises at least one integral anvil for supporting the spring and for providing a spring-forming edge between the baseplate and the load beam. The integral anvil is formed so that the spring-forming edge coincides with an optimal bend location on the spring, and the spring is permanently bent at the optimal bend location to couple the load beam at a desired angle with respect to the baseplate. In an unloaded condition, the permanent bend provides a desired pre-load characteristic for the suspension assembly.

In one implementation of the assembly, with the assembly oriented in a normal operating position, the linear flex spring attaches to an upper surface of the baseplate and also to an upper surface of the load beam. The upper surface of the assembly is further configured to allow forming of the permanent bend by downward pressure of a rolling tool on the spring around the spring-forming edge of the integral anvil. The bottom surface of the assembly is configured to abut a tooling anvil during forming of the permanent bend.

A method for pre-loading a suspension assembly is also disclosed, basically comprising forming an integral anvil to extend from a distal end of a baseplate, forming a spring-forming edge on the integral anvil, positioning an optimal bend location on the spring to coincide with the spring-forming edge, and forming a permanent bend in the spring by applying pressure on the spring around the spring-forming edge. A method of manufacturing a suspension assembly is also disclosed, and includes steps for forming on a baseplate an integral anvil having a spring-forming edge, bonding a linear flex spring to a surface of the baseplate so that a desired bend location coincides with the spring-forming edge, bonding another portion of the spring to a load beam surface, and forming a permanent bend in the spring by applying pressure on the spring around the spring-forming edge. These methods may optionally include additional forming steps for configuring a relief area on the integral anvil, or for configuring the suspension assembly to interface with one or more forming tools.

Some noteworthy advantages are realized by implementing one or more of the foregoing features of the present invention. Placement accuracy of the permanent bend is determined according to the accuracy of the technique used for forming or etching the integral anvil, rather than being dependent on a secondary tooling anvil-positioning system. This will simplify the process for controlling bend location, and obviate the need for high-precision placement of the tooling anvil. Another advantage arises from placement of the flex spring between the roller and the upper surfaces of the baseplate and load beam. This allows the roller to move freely along the surface of the spring without obstruction from other suspension assembly components, and reduces the offset error between the optimal bend location and the roller impact point. Another advantage arises from the application of relief areas on integral anvils. These areas allow for greater spring flexibility during the bending operation, resulting in a more resilient and shock-resistant spring.

Related systems, methods, features and advantages of the invention or combinations of the foregoing will be or will become apparent to one with skill in the art upon examination of the following figures and detailed description. It is intended that all such additional systems, methods, features, advantages and combinations be included within this description, be within the scope of the invention, and be protected by the accompanying claims.

BRIEF DESCRIPTION OF THE DRAWINGS

Preferred embodiments of the invention will hereinafter be described in conjunction with the appended drawings provided to illustrate and not to limit the invention. The components in the figures are not necessarily to scale, emphasis instead being placed upon illustrating the principles of the invention. In the figures, like reference numerals designate corresponding parts throughout the different views.

DETAILED DESCRIPTION

In accordance with the foregoing objectives of the invention, preferred embodiments are now described in further detail, which, when read in conjunction with the claims and drawings, give broader meaning and scope to the spirit of the invention.

As utilized herein, terms such as "about" and "substantially" and "approximately" are intended to allow some leeway in mathematical exactness to account for tolerances that are acceptable in the trade, or that would otherwise encompass a functionally equivalent variation. Accordingly, any deviations upward or downward from any value modified by such terms should be considered to be explicitly within the scope of the stated value.

The present invention discloses an improvement in the design of disk drive suspension assemblies. Specifically, the improvement is directed to providing tooling features integral to the suspension system to aid in forming suspension system components. In various embodiments disclosed herein, the tooling feature comprises an anvil integrally formed on a suspension system baseplate. The integral anvil greatly simplifies the process of pre-load forming, or pre-loading, the suspension assembly to counteract the lift force transmitted by the slider.

Figure 1:
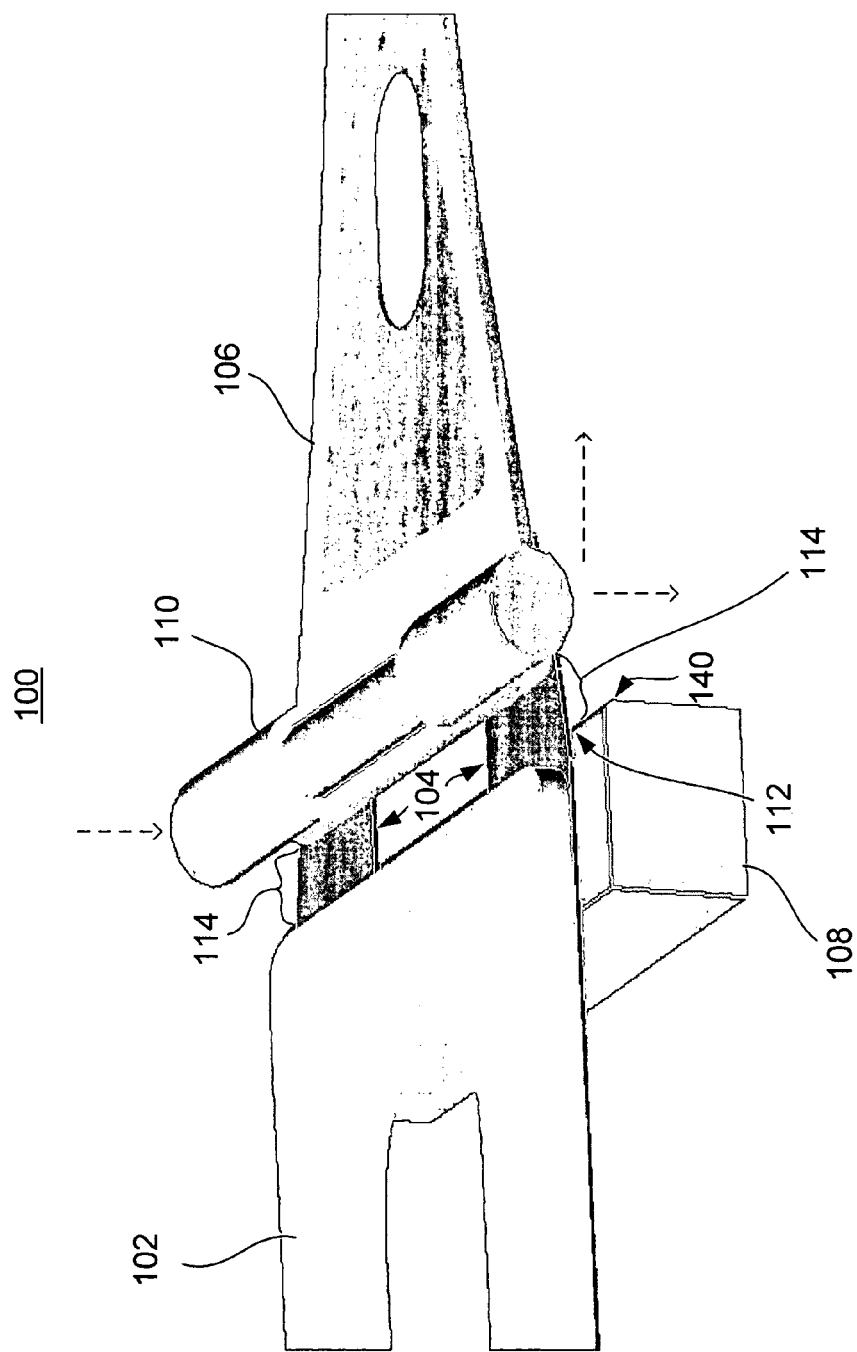
FIG. 1 illustrates a prior art suspension assembly having a spring bonded to the bottom surfaces of a baseplate and load beam, and a tooling anvil and roller used to form a bend in the spring.
Figure 2:
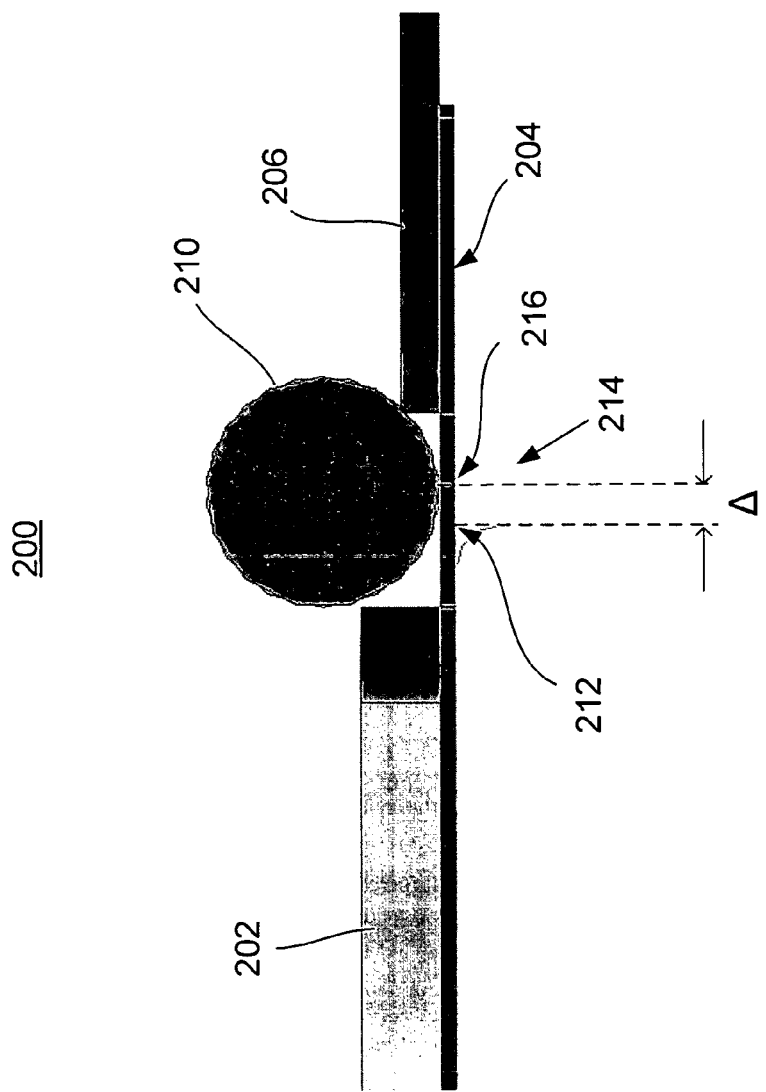
FIG. 2 shows a side view of a prior art suspension assembly having a short spring length between baseplate and load beam.
Figure 3:
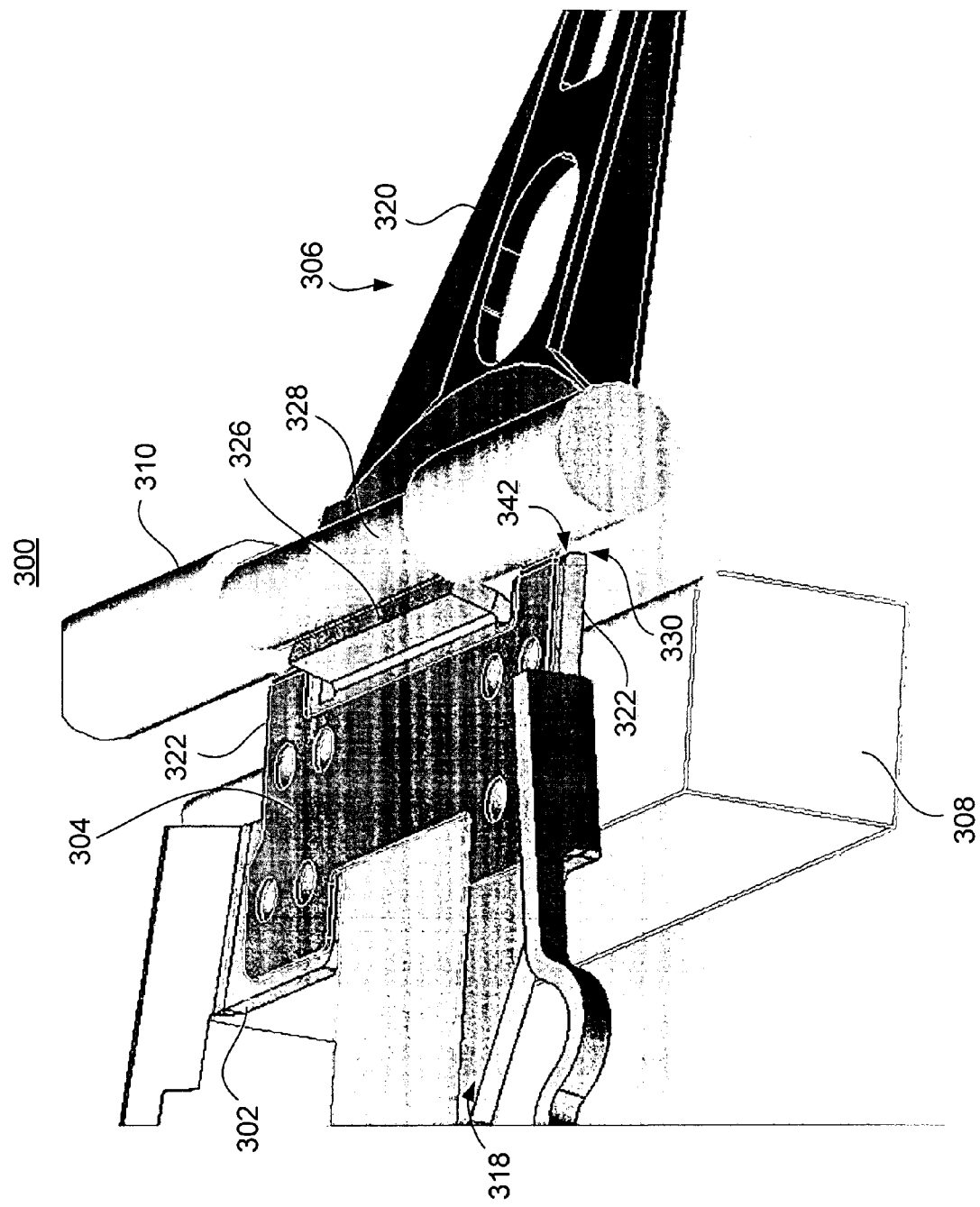
FIG. 3 illustrates one embodiment of a suspension assembly according to the invention configured with integral anvils for pre-load forming, shown with tooling anvil and roller.

FIG. 3 shows a top isometric view of one embodiment of a suspension assembly 300 according to the present invention. The proximal end of the assembly is shown on the left hand side of the page, and the distal end of the assembly is shown on the right-hand side of the page. Assembly 300 comprises a baseplate 302 coupled to a load beam 306 through a spring (or spring portion) 304. In the embodiment shown, spring 304 is a separate component that is bonded to an upper surface 318 of baseplate 302 at a distal end of baseplate 302. The opposite end of spring 304 is bonded to an upper surface 320 of load beam 306 at a proximal end of load beam 306. In other embodiments, spring 304 may be formed as an integral part of load beam 306. The bonds between spring 304 and the upper surfaces 318 and 320 may be effected by any conventional means; for example, by welding or by use of epoxy glue.

Baseplate 302 is configured with one or more integral anvils 322 for pre-load forming of spring 302. As shown in the figure, each integral anvil 322 in this embodiment comprises a tab extending from baseplate 302 to a position between the distal end of baseplate 302 and the proximal end of load beam 306. Each integral anvil is configured at its distal end with a rounded corner 342 at the top of a spring-forming edge 330. At the spring-forming edge 330 of each integral anvil 322, spring 302 bends downward about rounded corner 342, thereby coupling load beam 306 at an angle with respect to the upper surface of baseplate 302. Baseplate 302, spring 304, and load beam 306 are each composed of a metal, typically a stainless steel alloy of substantially uniform thickness. Baseplate 302 has a thickness several times that of spring 304 in order to provide effective anchorage during forming or flexing of the spring.

Forming tools are also shown in the figure in their approximate locations when preloading spring 304. A tooling anvil 308 abuts a bottom surface of baseplate 302, and a roller tool 310 is positioned above the assembly approximately directly above an optimal, or desired, bend location on spring 304. These tools are not components of assembly 300. They are shown to illustrate their cooperation with integral anvils 322 when forming springs 304. Skilled artisans will appreciate that cooperation of assembly 300 with forming tools 308 and 310 requires assembly 300 to possess certain interfacing features to ensure dimensional compatibility. One example of an interfacing feature is the shape of the bottom surface of baseplate 302. In the embodiment shown, the flat configuration of the bottom surface of baseplate 302 allows baseplate 302 to firmly abut the top surface of tooling anvil 308. This helps to ensure stable positioning of assembly 300 on tooling anvil 308, and also ensures an even distribution of load across the upper surface of tooling anvil 308 when roller 310 presses downward to form a permanent bend in spring 304. Surface interface configurations other than flat are certainly possible within the scope of the invention. Another example of an interfacing feature comprises placement of the spring-forming edge 330 of one or more integral anvils 322 at a location such that the impact point of a roller 310 may coincide with spring-forming edge 330, free of interference from other suspension assembly features or components. Another example of an interfacing feature is a height restriction on limiter 326 that provides sufficient clearance for the central recessed portion 328 of roller 310 to allow unobstructed movement of roller 310 across the surface of spring 304.

Figure 4:
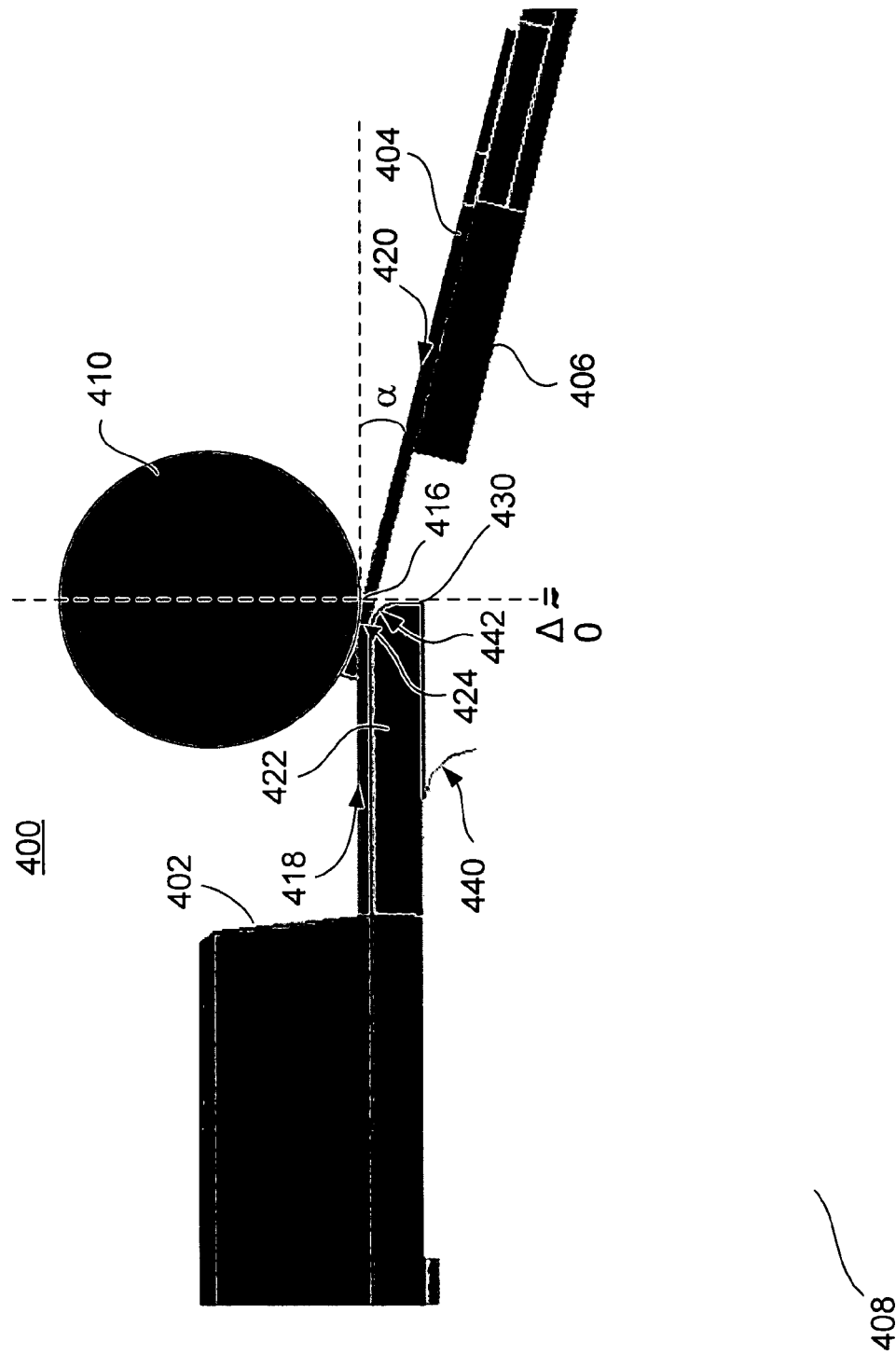
FIG. 4 shows a side view of an embodiment of the invention during pre-load forming.

FIG. 4 shows a side view of an embodiment of the invention during pre-load forming. Note that placement of spring 404 between roller 410 and assembly surfaces (in this case, upper surfaces 418 and 420) advantageously eliminates any mechanical interference of those surfaces with roller 410. In other words, by locating the baseplate and load beam steps on a surface of spring 404 opposite roller 410, roller 410 may be freely positioned along a surface of spring 404 until impact point 416 substantially coincides with an optimal bend location 424. This ability to freely position roller 410 allows the horizontal offset A to be reduced to approximately zero.

The configuration shown in FIG. 4 allows spring 404 to be bent with minimal error at optimal bend location 424 as roller 410 presses downward on spring 404 forcing it around corner 442 of integral anvil 422, while tooling anvil 408 abuts baseplate 402 to provide stability for assembly 400 during the bending operation. The resulting bend angle radius of spring 404 is influenced by curvature in corner 442, just as it would be influenced by the radius of curvature of corner 440 using prior art methods. However, it is worth noting that the curvature of corner 442 and the resulting bend angle radius in spring 404 are typically unequal. This is due to a springback effect (or resiliency) in spring 404, as well as the effect of roller stroke. Although artisans refer to the resulting bend as a "radius", note that the bend angle in spring 404 may not always be circular; but may resemble various non-circular forms of curvature such as elliptic, hyperbolic, or parabolic curves. The curvature of corner 442 may also comprise a circular or non-circular arc. In spring 404, the resulting bend angle radius (whether circular or non-circular), its uniformity, and its consistency from spring to spring, contribute significantly to suspension assembly performance. Controlling curvature of bending corner 442 is therefore an important aspect of quality control.

By controlling parameters such as bending corner curvature, roller force, roller travel, component material compositions and thicknesses, a suspension assembly according to the invention may be pre-loaded to a desired value by creating a permanent bend in spring 404. Thus, after removal of the tooling components, and with assembly 400 in an unloaded condition, spring 404 couples load beam 406 at a desired angle a with respect to baseplate 402.

Another advantage realized by configuring a baseplate 402 with at least one integral anvil 422 is that precision placement of a tooling anvil 410 is no longer required to ensure bending of spring 404 at optimal bend location 424. In an embodiment according to the invention, the bend location is determined according to the placement and formation of spring-forming edge 430 of integral anvil 422. Bend location accuracy is therefore controllable by the baseplate forming and/or etching processes used to configure the integral anvil. The role of tooling anvil 408 is thus reduced to providing a stable mounting surface for baseplate 402, and this allows for a much wider tolerance on placement of the tooling anvil.

Another advantage is that out-of-tolerance conditions in bend angle radius are far less likely, because each integral anvil is used only once in a bending operation. As a result, changes in the corner curvature of a tooling anvil are no longer an issue in quality control.

Figure 5:
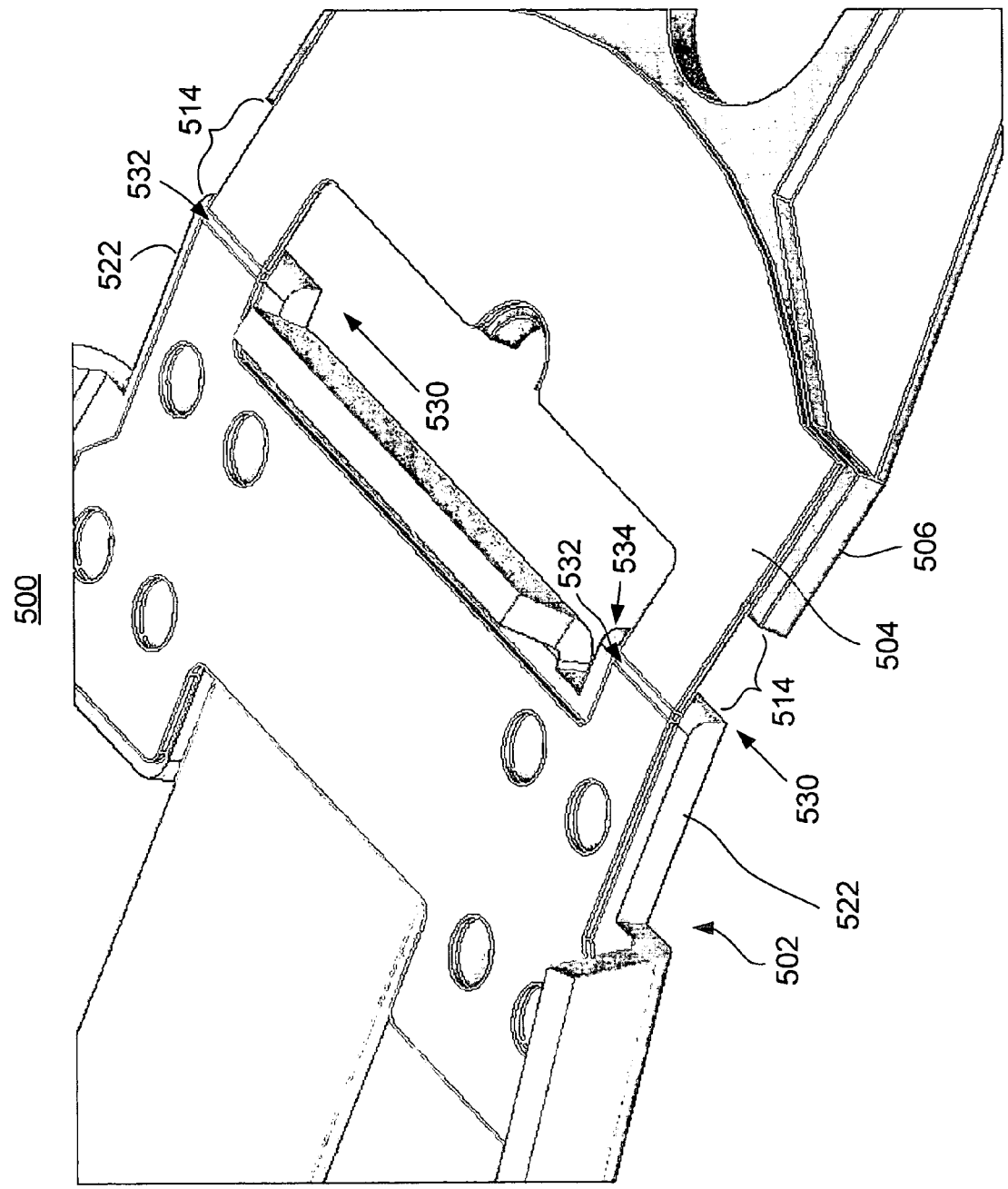
FIG. 5 shows a magnified isometric view of an embodiment of a baseplate according to the invention assembled to a spring and load beam.

FIG. 5 shows a magnified isometric view of an embodiment 500 of a baseplate 502 according to the invention assembled to a spring 504 and a load beam 506. Assembly 500 includes integral anvils 522, one on each side of baseplate 502, corresponding to bridging areas 514 of spring 504. Integral anvils 522 are formed for alignment of their spring-forming edges 530 coincident with the optimal bend location 532, when spring 504 is bonded to baseplate 502 in a desired location. In this embodiment, the upper corners of integral anvils 522 comprise rounded corners 534. Rounded corners 534 may be employed to provide a smoother fulcrum for the bend in location 532 to reduce the probability of spring fatigue or fracture during pre-load forming. This also reduces the probability of spring failure at the bend location during an excessive load condition such as a shock.

In the embodiments presented thus far, the integral anvils have been shown having a uniform thickness—the same thickness of the baseplate from which the integral anvil is formed. Additional embodiments are now disclosed wherein a portion of an integral anvil is configured with less thickness than the uniform thickness to achieve an additional manufacturing advantage.

Figure 6:
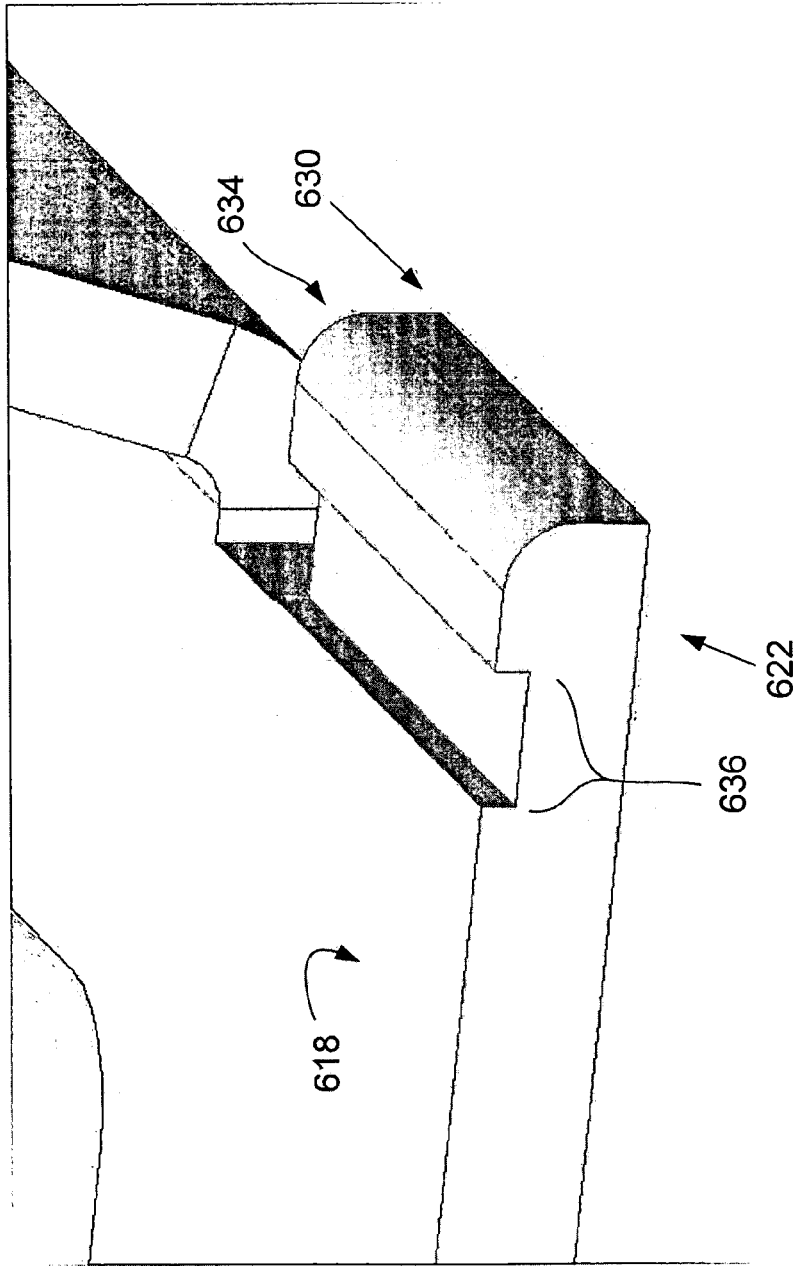
FIG. 6 is a magnified isometric view of one embodiment of the invention, showing a baseplate with integral anvil and a relief area channel.

FIG. 6 shows a magnified isometric view of an embodiment of the invention, showing a baseplate 602 configured with an integral anvil 622. In this embodiment, integral anvil 622 includes a relief area 636 comprising a rectangular channel running through the upper surface in a transverse direction parallel to spring-forming edge 630. Relief area 636 may be formed by etching or precision machining. The purpose of relief area 636 is twofold. First, it lessens the total frictional force that acts against a spring (not shown) under tension during a bending operation as the spring is stretched across upper surface 618 and around corner 634. Second, the elimination of friction beneath the portion of the spring covering relief area 636 allows that spring portion greater flexibility, thereby facilitating stretching and bending of the spring at a location adjacent to the optimal bend location when the spring is subject to rolling tool pressure. This creates greater uniformity in the thickness of the spring throughout the bend, resulting in a more resilient spring.

Figure 7:
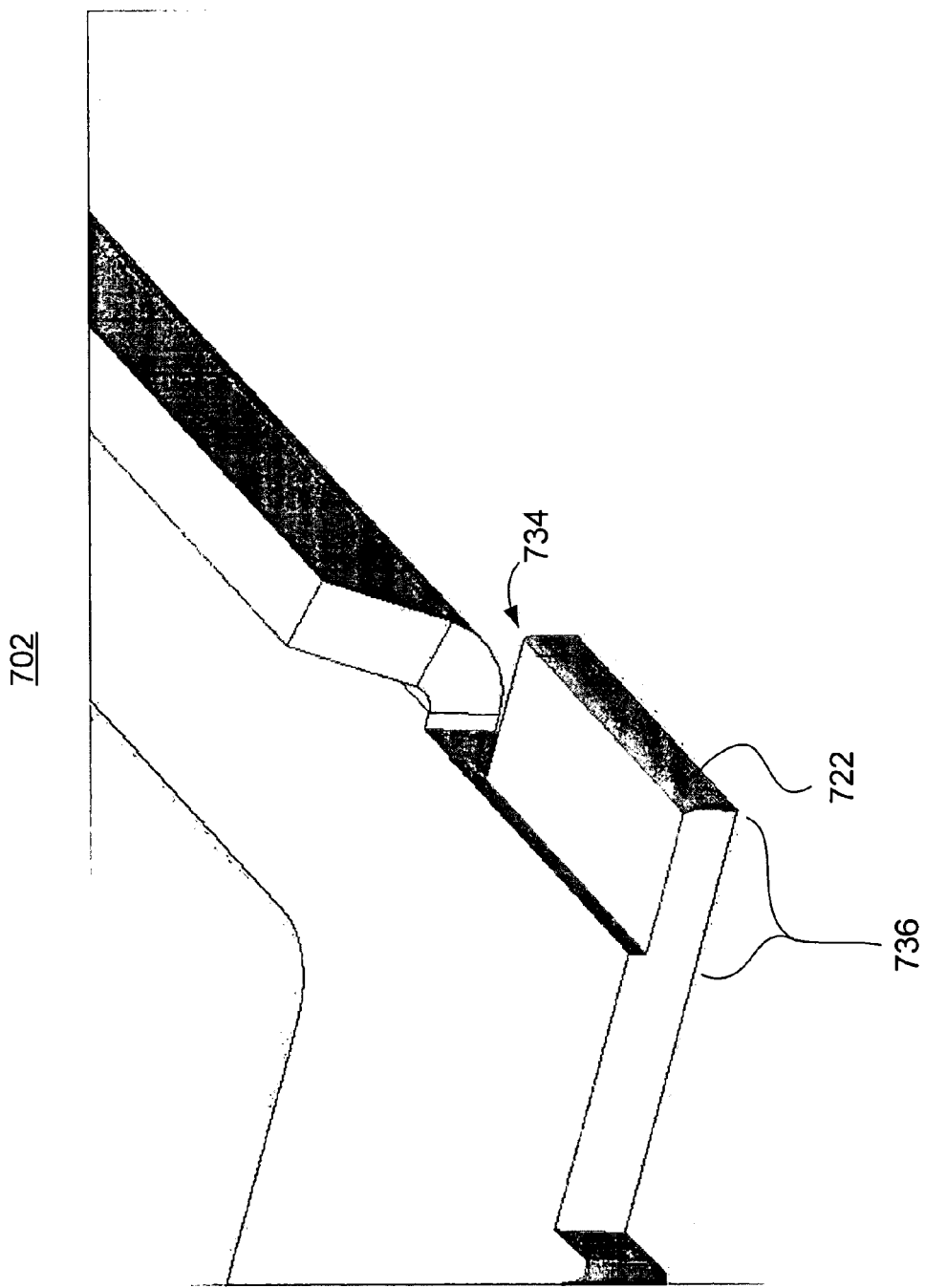
FIG. 7 is a magnified isometric view of another embodiment of a baseplate according to the invention, this one having a relief area etched over the entire upper surface of the integral anvil.

FIG. 7 shows a magnified isometric view of another embodiment of a baseplate 702 according to the invention, this one having a relief area 736 etched or machined over the entire upper surface of integral anvil 722 to reduce its overall thickness. In this embodiment, the only contact between integral anvil 722 and its corresponding spring occurs at the junction of corner 734 and the optimal bend location. Many other embodiments of a baseplate according to the invention are possible, wherein the baseplate includes some configuration of one or more relief areas that create a portion of the integral anvil having less thickness than the uniform thickness of the baseplate.

Figure 8:
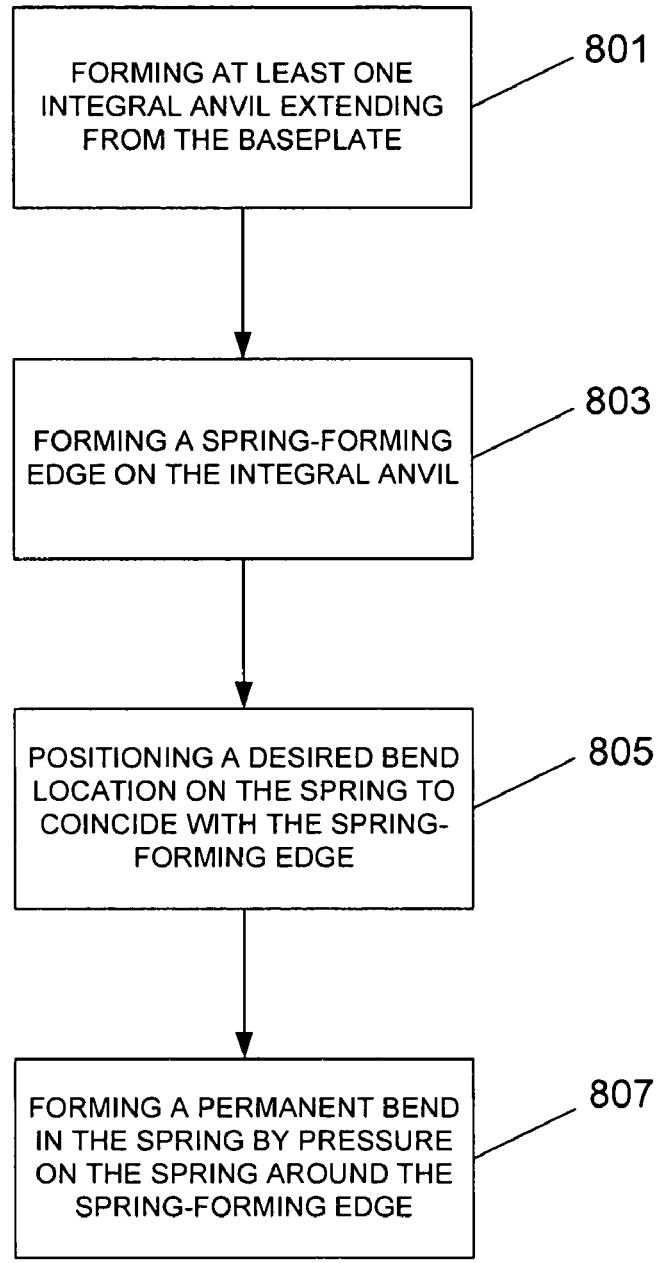
FIG. 8 illustrates an embodiment of a method according to the invention for pre-loading a hard disk drive suspension assembly.

FIG. 8 illustrates an embodiment of a method 800 according to the invention for pre-loading a hard disk drive suspension assembly. These method steps may be deduced from the foregoing disclosure, and are presented in flowchart form for greater clarity. Additional method steps or limitations not expressly included within the flow chart may be similarly deduced from the foregoing disclosure.

Method 800 begins at step 801, which comprises forming at least one integral anvil on a baseplate, such that the integral anvil extends in a longitudinal or distal direction toward the load beam end. Any appropriate forming technique may be used, such as stamping, cutting, and/or bending a baseplate from sheet metal using tooling such as a progressive forming die. In another implementation, step 801 may further comprise forming an integral anvil to position its distal edge at a location coincident with an optimal bend location on a spring, when the spring is attached to the baseplate a desired or predetermined location. The method then proceeds to step 803. This step comprises forming a spring-forming edge on the integral anvil. In one example, this forming step comprises creating a rounded corner on a spring-forming edge of the integral anvil.

The next step 805 comprises positioning a desired, or optimal bend location on a spring to coincide with the spring-forming edge. Implied in this step is bonding or otherwise attaching the spring to the baseplate at a predetermined or desired location, such that the optimal bend location on the spring lines up with the spring-forming edge of the integral anvil. In the final step 807, the suspension assembly is pre-loaded by forming a permanent bend in the spring by an appropriate tooling means. In one embodiment, this means comprises supporting the assembly by means of a tooling anvil, and applying pressure to the spring using a roller to bend the spring around the spring-forming edge of the integral anvil.

Figure 9:
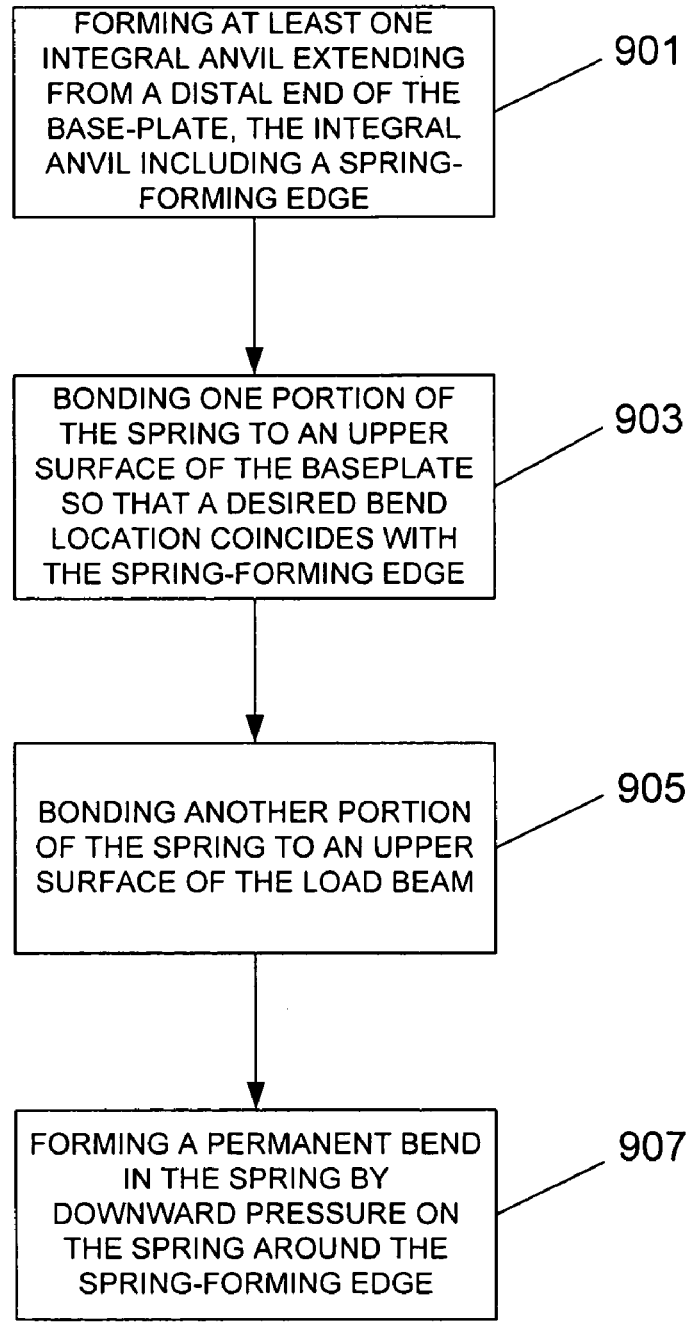
FIG. 9 illustrates an embodiment of a -method according to the invention for manufacturing a baseplate for a hard disk drive suspension.

FIG. 9 illustrates an embodiment of a method 900 according to the invention for manufacturing a baseplate for a hard disk drive suspension. The steps of method 900 are presented in flowchart form for greater clarity. Additional method steps or limitations not expressly included within the flow chart may be deduced from the foregoing disclosure.

Method 900 begins at step 901, which comprises forming at least one integral anvil on a distal end of the baseplate, such that the integral anvil includes a spring-forming edge.

Formation of the spring-forming edge may include any appropriate forming techniques such as cutting, shaping, stamping, or etching a baseplate, and may also include forming a rounded corner on the spring-forming edge. The next step 903 comprises bonding one portion of the spring to an upper surface of the baseplate so that a desired bend location coincides with the spring-forming edge. In another embodiment, a portion of the spring is bonded to a baseplate surface so that the spring lies between the baseplate and a roller contact point. In any of these embodiments, bonding may be effected by any means known in the art, e.g. by applying an adhesive, or by welding, riveting, fastening, etc. The next step 905 comprises bonding another portion of the spring to an upper surface of the load beam. In another embodiment, the other portion of the spring is bonded to a load beam surface so that both the baseplate and load beam lie substantially on a common side of the spring. The final step 907 comprises pre-loading the suspension assembly by forming a permanent bend in the spring by downward exerting pressure on the spring around the spring-forming edge.

While various embodiments of the invention have been illustrated and described, it will be apparent to those of ordinary skill in the art that many more embodiments and implementations are possible that are within the spirit and scope of this invention. Accordingly, the invention is not to be restricted except in light of the attached claims and their equivalents.

What is claimed is:

1. In a hard disk drive suspension assembly comprising a linear flex spring connected to a load beam and to baseplate, the baseplate comprising:
at least one integral anvil extending from a distal end of the baseplate, the anvil having an edge, the spring having been bent around the edge by pressure on the spring over the anvil edge to form a permanent bend in the spring.

2. The baseplate of claim 1 wherein the edge is rounded.

3. The baseplate of claim 1 having a substantially uniform thickness, and wherein the at least one integral anvil includes a relief portion underneath the spring having less thickness than the substantially uniform thickness.

4. The baseplate of claim 3 wherein the relief portion comprises an entire upper surface of the at least one integral anvil.

5. The baseplate of claim 3 wherein the relief portion comprises a channel running through an upper surface of the at least one integral anvil.

6. The baseplate of claim 1 configured to position the edge coincident with an optimal bend location on the spring.

7. A hard disk drive suspension assembly comprising the baseplate of claim 1 configured with a flat bottom surface, a spring configured with a wide bridging area, and a limiter with a low height to allow the forming of the permanent bend by downward pressure of a rolling tool on the spring around the edge of the integral anvil.

8. The baseplate of claim 1 wherein the pressure was caused by a rolling tool stroke.

9. The baseplate of claim 1 wherein the pressure was caused by an impact of a roller.

10. The baseplate of claim 1 wherein the stretching of the spring around the edge under pressure comprises cold rolling around the anvil edge.

11. The baseplate of claim 1 wherein a metal in the spring has been forced around the anvil edge by the pressure of a rolling tool.

12. A hard disk drive comprising the baseplate of claim 1, the baseplate coupled to a load beam, the load beam coupled to a slider, the slider having mounted upon it a read/write head, the read/write head suspended in close proximity to a disk.

13. A suspension assembly for a hard disk drive comprising:
a load beam;
a linear flex spring connected to the load beam; and
a baseplate comprising at least one integral anvil for supporting the spring and for providing a spring-forming edge between the baseplate and the load beam, the edge coinciding with an optimal bend location on the spring;
wherein a permanent bend at the optimal bend location was formed by pressure on the spring between a tool and the anvil.

14. The suspension assembly of claim 13 wherein the spring in an unloaded condition bends at the optimal bend location thereby coupling the load beam at an angle with respect to the baseplate.

15. The suspension assembly of claim 13 wherein the spring comprises an integral part of the load beam.

16. The suspension assembly of claim 13 wherein the spring is bonded to the baseplate.

17. The suspension assembly of claim 13 wherein, with the assembly oriented in a normal operating position, the spring attaches to an upper surface of the baseplate.

18. The suspension assembly of claim 13 wherein, with the assembly oriented in a normal operating position, the spring attaches to an upper surface of the load beam.

19. The suspension assembly of claim 13 wherein the baseplate has a substantially uniform thickness.

20. The suspension assembly of claim 19 wherein the at least one integral anvil includes a relief portion having less thickness than the substantially uniform thickness.

21. A hard disk drive comprising the suspension assembly of claim 13, the suspension assembly coupled to a slider, the slider having mounted upon it a read/write head, the read/write head suspended in close proximity to a disk.

22. A method for pre-loading a hard disk drive suspension assembly having a baseplate coupled to a load beam through a linear flex spring, comprising:
    forming at least one integral anvil extending from a distal end of the baseplate;
    forming a spring-forming edge on the integral anvil;
    positioning a desired bend location on the spring to coincide with the spring-forming edge; and
    forming a permanent bend in the spring by pressure on the spring around the spring-forming edge.

23. The method of claim 22 further comprising maintaining a bottom surface of the assembly on a tooling anvil during the forming of the permanent bend.

24. The method of claim 22 wherein the second forming step further comprises pressing the spring by means of a roller.

25. The method of claim 22 wherein the first forming step further comprises forming, in the at least one integral anvil, a relief portion having less thickness than the baseplate prior to forming.

26. The method of claim 25 wherein the relief portion is formed by etching.

27. A method for manufacturing a hard disk drive suspension assembly comprising a baseplate coupled to a load beam through a linear flex spring, comprising:
    forming at least one integral anvil extending from a distal end of the baseplate, the integral anvil including a spring-forming edge;
    bonding one portion of the spring to an upper surface of the baseplate so that a desired bend location on the spring coincides with the spring-forming edge; bonding another portion of the spring to an upper surface of the load beam; and
    forming a permanent bend in the spring by downward pressure on the spring around the spring-forming edge.

28. The method of claim 27 wherein the second forming step further comprises maintaining a bottom surface of the baseplate on a tooling anvil while pressing the spring by means of a roller.

29. The method of claim 27 wherein the first forming step further comprises forming, in the at least one integral anvil, a relief portion having less thickness than the baseplate prior to forming.

30. In a hard disk drive suspension assembly comprising a linear flex spring connected to a load beam, a baseplate comprising:
    at least one integral anvil extending from a distal end of the baseplate to provide an edge for forming a permanent bend in the spring;
    wherein the spring has a permanent bend therein for providing a pre-load force, said permanent bend in the spring being located at least partially over a rounded portion of said edge.

31. The baseplate of claim 30 wherein said permanent bend is located entirely over a rounded portion of said edge.

32. The baseplate of claim 30 wherein said permanent bend in the spring was formed by pressing down on the spring against said integral anvil edge.

* * * * *

UNITED STATES PATENT AND TRADEMARK OFFICE
CERTIFICATE OF CORRECTION

| | |
|---|---|
| PATENT NO. | : 7,420,772 B1 |
| APPLICATION NO. | : 11/282450 |
| DATED | : September 2, 2008 |
| INVENTOR(S) | : Shijin Mei |

It is certified that error appears in the above-identified patent and that said Letters Patent is hereby corrected as shown below:

In claim 1, column 8, line 17, after "and to" insert -- a --.

Signed and Sealed this

Twenty-eighth Day of October, 2008

JON W. DUDAS
*Director of the United States Patent and Trademark Office*